United States Patent
Ruhlen et al.

(10) Patent No.: US 9,578,114 B2
(45) Date of Patent: Feb. 21, 2017

(54) EXTERNAL SERVICE APPLICATION DISCOVERY METHOD

(75) Inventors: Matthew James Ruhlen, Redmond, WA (US); Mark Timothy Fields, Redmond, WA (US); Christopher Von Hansen, Redmond, WA (US); Yanlin Peng, Redmond, WA (US); Marc Christopher Ramsey, Seattle, WA (US); Nicholas Michael Simons, Redmond, WA (US); Alexei Vopilov, Redmond, WA (US); Kenneth J. Yuhas, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 13/284,543

(22) Filed: Oct. 28, 2011

(65) Prior Publication Data

US 2013/0080507 A1  Mar. 28, 2013

Related U.S. Application Data

(60) Provisional application No. 61/539,975, filed on Sep. 27, 2011.

(51) Int. Cl.
| | | |
|---|---|---|
| *G06F 15/16* | (2006.01) | |
| *H04L 29/08* | (2006.01) | |
| *H04L 29/06* | (2006.01) | |

(52) U.S. Cl.
CPC ........... *H04L 67/16* (2013.01); *H04L 67/1002* (2013.01); *H04L 63/0807* (2013.01); *H04L 63/105* (2013.01)

(58) Field of Classification Search
None
See application file for complete search history.

(56) References Cited

U.S. PATENT DOCUMENTS

| 5,875,296 A | 2/1999 | Shi et al. |
| 6,708,215 B1 | 3/2004 | Hingorani et al. |
| | (Continued) | |

FOREIGN PATENT DOCUMENTS

| CN | 1225479 A | 8/1999 |
| CN | 1853167 A | 6/2011 |
| | (Continued) | |

OTHER PUBLICATIONS

International Search Report and Written Opinion for PCT/US2012/057670 mailed Mar. 4, 2013.

(Continued)

*Primary Examiner* — Mohamed Ibrahim
(74) *Attorney, Agent, or Firm* — Danielle Johnston-Holmes; Tom Wong; Micky Minhas

(57) ABSTRACT

An external service application discovery process that connects a host with an external application server running a service application allowing a user of a client computing device to work with a file via a web browser. The host brokers the functionality of an external application server and serves as the platform where interactions between the client computing device and the external application server occur. An open interface protocol, which is a shared communication protocol, allows the host to communicate instructions from the client computing device to the external application server. Through the external service application discovery process, the external application server describes functionality provided by the service application to the host. The host selectively makes the functionality provided by the service application available to users based on the level of implementation of the open platform interface and the conventions of the external service application discovery process understood by the host.

20 Claims, 6 Drawing Sheets

(56) References Cited

U.S. PATENT DOCUMENTS

| | | | |
|---|---|---|---|
| 6,766,298 | B1 | 7/2004 | Ravishankar et al. |
| 6,931,429 | B2* | 8/2005 | Gouge et al. ............... 709/203 |
| 6,988,241 | B1 | 1/2006 | Guttman et al. |
| 7,120,590 | B1 | 10/2006 | Eisen et al. |
| 7,127,670 | B2 | 10/2006 | Bendik |
| 7,340,714 | B2 | 3/2008 | Upton |
| 7,376,650 | B1 | 5/2008 | Ruhlen |
| 7,401,131 | B2 | 7/2008 | Robertson et al. |
| 7,475,125 | B2 | 1/2009 | Brockway et al. |
| 7,603,450 | B2 | 10/2009 | Lutz |
| 7,606,814 | B2 | 10/2009 | Deily et al. |
| 7,644,414 | B2 | 1/2010 | Smith et al. |
| 7,650,432 | B2 | 1/2010 | Bosworth et al. |
| 7,716,357 | B2 | 5/2010 | Milligan et al. |
| 7,720,906 | B2 | 5/2010 | Brockway et al. |
| 8,195,792 | B2 | 6/2012 | Ruhlen et al. |
| 9,319,469 | B2 | 4/2016 | Ruhlen et al. |
| 2001/0032220 | A1 | 10/2001 | Ven Hoff |
| 2003/0014521 | A1* | 1/2003 | Elson et al. ............... 709/225 |
| 2003/0084045 | A1 | 5/2003 | Anderson et al. |
| 2003/0204579 | A1 | 10/2003 | Lutz |
| 2003/0208563 | A1 | 11/2003 | Acree et al. |
| 2004/0006492 | A1 | 1/2004 | Watanabe |
| 2004/0143669 | A1 | 7/2004 | Zhao et al. |
| 2004/0243923 | A1 | 12/2004 | Nakamura |
| 2005/0021771 | A1 | 1/2005 | Kaehn et al. |
| 2005/0049924 | A1 | 3/2005 | DeBettencourt et al. |
| 2005/0125529 | A1* | 6/2005 | Brockway ............... H04L 67/16 709/224 |
| 2005/0193106 | A1* | 9/2005 | Desai ............... H04L 69/329 709/223 |
| 2005/0268215 | A1 | 12/2005 | Battagin et al. |
| 2007/0038610 | A1 | 2/2007 | Omoigui |
| 2007/0061698 | A1 | 3/2007 | Megiddo et al. |
| 2007/0100967 | A1 | 5/2007 | Smith et al. |
| 2008/0209037 | A1 | 8/2008 | Zernik et al. |
| 2008/0244721 | A1 | 10/2008 | Barrus et al. |
| 2009/0007067 | A1* | 1/2009 | Hepper et al. ............... 717/115 |
| 2009/0064148 | A1 | 3/2009 | Jaeck et al. |
| 2009/0150417 | A1* | 6/2009 | Ghods ............... G06F 9/541 |
| 2009/0157987 | A1 | 6/2009 | Barley et al. |
| 2010/0185747 | A1 | 7/2010 | Ruhlen et al. |
| 2010/0211781 | A1 | 8/2010 | Auradkar et al. |
| 2011/0083167 | A1 | 4/2011 | Carpenter et al. |
| 2011/0093941 | A1 | 4/2011 | Liu et al. |
| 2011/0138478 | A1 | 6/2011 | Kaarela et al. |
| 2011/0151840 | A1 | 6/2011 | Gong et al. |
| 2013/0080785 | A1 | 3/2013 | Ruhlen et al. |

FOREIGN PATENT DOCUMENTS

| | | |
|---|---|---|
| CN | 102118249 A | 7/2011 |
| KR | 10-2009-0038105 | 4/2009 |
| TW | 514814 | 12/2002 |

OTHER PUBLICATIONS

Project Server 2010 Architecture—Published Date: May 2010-##. http://msdn.microsoft.com/en-us/library/ee767687.aspx. pp. 5.

Web Parts that Host External Applications Such as Silverlight. Published Date: May 2010-##. http://msdn.microsoft.com/en-us/library/ee535524.aspx. pp. 5.

Custom composite application discovery. Retrieved Date: Jun. 21, 2011. http://publib.boulder.ibm.com/infocenter/tivihelp/v17r1/index.jsp?topic=/com.ibm.tivoli.tpm.chg.doc_5.1.0.2/discovery/rdsc_TADDMcust.html. pp. 3.

"Work with Others the Easy Way with Office Live Workspace", retrieved at <<http://officeliveoffers.com/Workspace/sharing/default.htm?cid=09C6EA06-756E-4C94-B5CE-E4991DE9F87F>>, Nov. 10, 2008, p. 1.

"Office Applications Toolkit", retrieved at <<http://news.zdnet.co.uk/software/0,1000000121,39523769,00.htm?r=1>>, Oct. 21, 2008, pp. 5.

"Office OCX & Office Component", retrieved at <<http://www.officeocx.com/>>, Nov. 10, 2008, pp. 3.

"Google Docs", retrieved at <<http://www.google.com/google-d-s/intl/en/tour1.html>>, Nov. 10, 2008, p. 1.

Perez, Sarah, "Office Live Workspace vs Google Docs: Feature-by-Feature Comparison", retrieved at <<http://www.readwriteweb.com/archives/office_live_workspace_vs_google_docs_feature_by_feature.php>>, Nov. 10, 2008, pp. 11.

Bean, Liam "Web based Office Suites", retrieved at <<http://hubpages.com/hub/Web-Based-Office-Suites>>, Nov. 10, 2008, pp. 7.

Office Action mailed Sep. 3, 2010, in co-pending U.S. Appl. No. 12/354,928.

Office Action mailed Jan. 25, 2011, in co-pending U.S. Appl. No. 12/354,928.

Notice of Allowance mailed Dec. 14, 2011, in co-pending U.S. Appl. No. 12/354,928.

International Search Report and Written Opinion for PCT/US2012/057657 mailed Mar. 25, 2013.

Goh et al. (SiRiUS: Securing Remote Untrusted Storage) in proceedings of the Internet Society (ISOC) Network and Distributed Systems Security (NDSS) Symposium 2003, pp. 131-145.

U.S. Appl. No. 13/329,964, Final Office Action dated Jul. 28, 2014, 27 Pages.

U.S. Appl. No. 13/329,964, Amendment & Response Filed May 13, 2014 Responding to Non-Final Office Action dated Feb. 13, 2014, 15 Pages.

U.S. Appl. No. 13/329,964, Non-Final Office Action dated Feb. 13, 2014, 34 Pages.

International Search Report dated Mar. 4, 2013, issued in PCT Application No. PCT/US2012/057570; 10 pgs.

Chinese Office Action dated Sep. 3, 2014 in Appln No. 201210364186.x, 14 pgs.

Chinese Office Action dated Jan. 7, 2015 in Appln No. 201210364421.3, 15 pgs.

Bourquin; Google Apps as an Alternative to Microsoft Office in a Multinational Company. The GAPS Project. Published May 31, 2010; irecouillard.weebly.com/uploads/5/1/9/8/5198042/collaborative_computing_to improve_work_process_final.pdf. pp. 79.

Couillard; Collaborative Computing to Improve Work Process: Document Collaboration. Published Mar. 2011. http://clairecouillard.weebly.com/uploads/5/1/9/8/5198042/collaborative computing_to improve_work_process_final.pdf. pp. 8.

harmon.ie. Editing Documents. Retrieved Jun. 22, 2011. http://www.mainsoft.comlspnotes-20-doc/editingdocuments. pp. 2.

Joining Dots. SharePoint and Office Web Apps. Published Jul. 12, 2010; http://www.joiningdots.com/blog/2010/07/sharepoint-and-office-web-apps/. pp. 6.

Microsoft/TechNet. Office Web Apps overview (Installed on SharePoint 2010 Products). Published Aug. 27, 2010. http://technet.microsoft.com/en-us/library/ff43168S.aspx. pp. 8.

Notice of Allowance dated Feb. 3, 2012, issued in U.S. Appl. No. 12/354,928, 9 pgs.

Office Action dated Dec. 17, 2014, issued in U.S. Appl. No. 13/329,964, 30 pgs.

Supplementary European Search Report Issued in Application No. 12836757.0, Mailed Date: Mar. 25, 2015, 5 Pages.

Chinese Second Office Action and Search Report Issued in Patent Application No. 201210364186.X, Mailed Date: May 15, 2015, 15 Pages.

Office Action dated Jul. 8, 2015, issued in U.S. Appl. No. 13/329,964, 14 pgs.

No stated author; R1—Advanced Server-Side Authentication for Data Connections in InfoPath 2007 Web-Based Forms; 2007; Retrieved from the Internet <URL: msdn.microsoft.com/en-us/library/bb787184(v=office.12).aspx>; pp. 1-7 as printed.

No stated author; R2—Microsoft.Office.Server.ApplicationRegistry.MetadataModel Namespace; 201 O; Retrieved from the Internet <URL: msdn.microsoft.com/en-us/library/microsoft.office.server.applicationregistry.metadatamodel.aspx>; pp. 1-2 as printed.

(56) References Cited

OTHER PUBLICATIONS

No stated author; R3—Microsoft.Office.DocumentManagement Namespace; 2010; Retrieved from the Internet <URL: msdn.microsoft.com/EN-US/library/office/microsoft.office.documentmanagement(v=office.14).aspx>; 1 page as printed.

EP Extended Search Report dated Jul. 30, 2015 in Appln No. PCT/US2012/057670, 9 pgs.

Chinese Second Office Action dated Sep. 6, 2015 in Appln No. 201210364421.3, 12 pgs.

Chinese Third Office Action Issued in Patent Application No. 201210364186.X, Mailed Date: Nov. 23, 2015, 12 Pages.

Notice of Allowance dated Dec. 11, 2015, issued in U.S. Appl. No. 13/329,964, 8 pgs.

Chinese Third Office Action and Search Report Issued in Chinese Patent Application No. 201210364421.3, Mailed Date: Apr. 28, 2016, 18 Pages.

Taiwan Notice of Allowance dated Jun. 14, 2016 in Appln No. 101128301, 4 pgs.

Taiwan Search Report dated Feb. 22, 2016 in Application 101128301, 1 pg.

Chinese Notice of Allowance Issued in Patent Application No. 201210364186.X, Mailed Date: Jun. 13, 2016, with English translation 4 Pages.

\* cited by examiner

Mobile Computing Device

EXTERNAL SERVICE APPLICATION DISCOVERY METHOD

RELATED APPLICATIONS

This application claims benefit under 35 U.S.C. §119(e) of U.S. Provisional Patent Application Ser. No. 61/539,975, titled "Open Platform Interface" and filed on Sep. 27, 2011, the entirety of which is incorporated by reference herein.

BACKGROUND

Enterprises often maintain various types of documents that are stored in different places for different purposes. In many cases, such documents are created and stored according to a variety of different software applications and storage systems. For example, documents may be generated using word processing applications, spreadsheet applications, presentation applications, note applications, graphic design applications, photographic applications, and the like. Generated documents may be stored via a variety of storage systems, including one or more content servers used for storing documents of various types, servers for storing documents as attachments to electronic mail items (e-mail), storage systems for storing documents as attachments to meetings, customer relationship management (CRM) systems for storing documents as attachments to leads or customer data, general purpose document stores for storing documents for routine use, and/or specialized document stores (e.g., Documentum® from Documentum, Inc.) for storing documents for specific, highly regulated needs.

Accessing and working with these various types of documents often requires that the appropriate software for each document type be available to users. The typical enterprise scenario envisions that each person who needs to access or work with a document will have the appropriate software locally installed on the computing device they routinely use. Where everyone has access to the same set and versions of applications, this is a workable approach. However, in many situations, where a number of users may only use a given software application on an infrequent basis the given software application may not be loaded on the users' computing devices by the enterprise. One approach to remedy such problems has been to convert documents into a "published" format that is readily viewable but not readily editable. Another approach to providing access to various document types without the need for local installations of the necessary software packages has been to provide viewing and editing functionality innately within a content server or to provide for direct (i.e., hard coded) integration between a content server and a dedicated system for viewing and editing supported documents; however enterprises are often discouraged from integrating such functionality with their content servers for fear that such integration of additional functionality may reduce processing capacity and capability of the likely mission-critical uses, increase downtime, and/or complicate the management of their content servers. Further, the resources invested in a dedicated system (e.g., the time, effort, and expense associated development, procurement, and deployment) are unlikely to be transferable to another platform.

It is with respect to these and other considerations that the present invention has been made.

BRIEF SUMMARY

The following Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

According to embodiments, the external service application discovery process connects one or more hosts with one or more service applications that allow a user of a client computing device to work with a file via a general client application (i.e., a web browser). An open platform interface, which is a shared communication protocol, allows the host and the external application server to communicate, regardless of the native communication protocol of the host. Through the external service application discovery process described by the conventions of the open platform interface, the external application server describes the functionality provided by the service application and how to invoke that functionality. The host selectively makes the functionality provided by the service application available to users based on the level of implementation of the open platform interface and the conventions of the external service application discovery process understood by the host.

Integration with the external application server is a responsibility of the host accomplished through a process called discovery during which the host learns about the functionality supported by external application server. Prior to discovery, the host is not required to have any knowledge of the availability or functionality of an external application server. To participate in discovery of the external application server, the host must understand the open platform interface and the discovery conventions associated with the open platform interface. The behavior of the host changes based on the availability and functionality of the external application server.

The external service application discovery process is initiated from the host by providing the location of a discovery data source which contains the information describing the functionality of the external application server. The discovery data is maintained by the external application server and provided to the host as response or in a discovery document. After obtaining the location of the discovery data, the host issues a discovery request to the discovery data source. Upon receipt of the discovery request, the discovery data source provides a response containing the discovery data describing the functionality supported by the external application server (i.e., the properties of the external application server). The discovery data is formatted according to and contains information specified by the conventions of the open platform interface. The host consumes the discovery data returned by the discovery data source. After consuming the discovery data, the host stores the information about the actions supported by the service application for the associated file type. After completing the external service application discovery process, the behavior of the host changes to integrate the advertised functionality of the service application that is supported by the host.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

An external service application discovery process for connecting a host with an external application server is described herein and illustrated in the accompanying figures. The external service application discovery process connects one or more hosts with one or more service applications that allow a user of a client computing device to work with a file over a network via a general client application communicating with a host. An open platform interface, which is a shared communication protocol, allows the external application server and the host to interact, regardless of the native communication protocol of the host. Through the external service application discovery process described by the conventions of the open platform interface, the external application server describes the functionality provided by the service application and how to invoke that functionality. The host selectively makes the functionality provided by the service application available to users based on the level of implementation of the open platform interface and the conventions of the external service application discovery process understood by the host.

Figure 1:
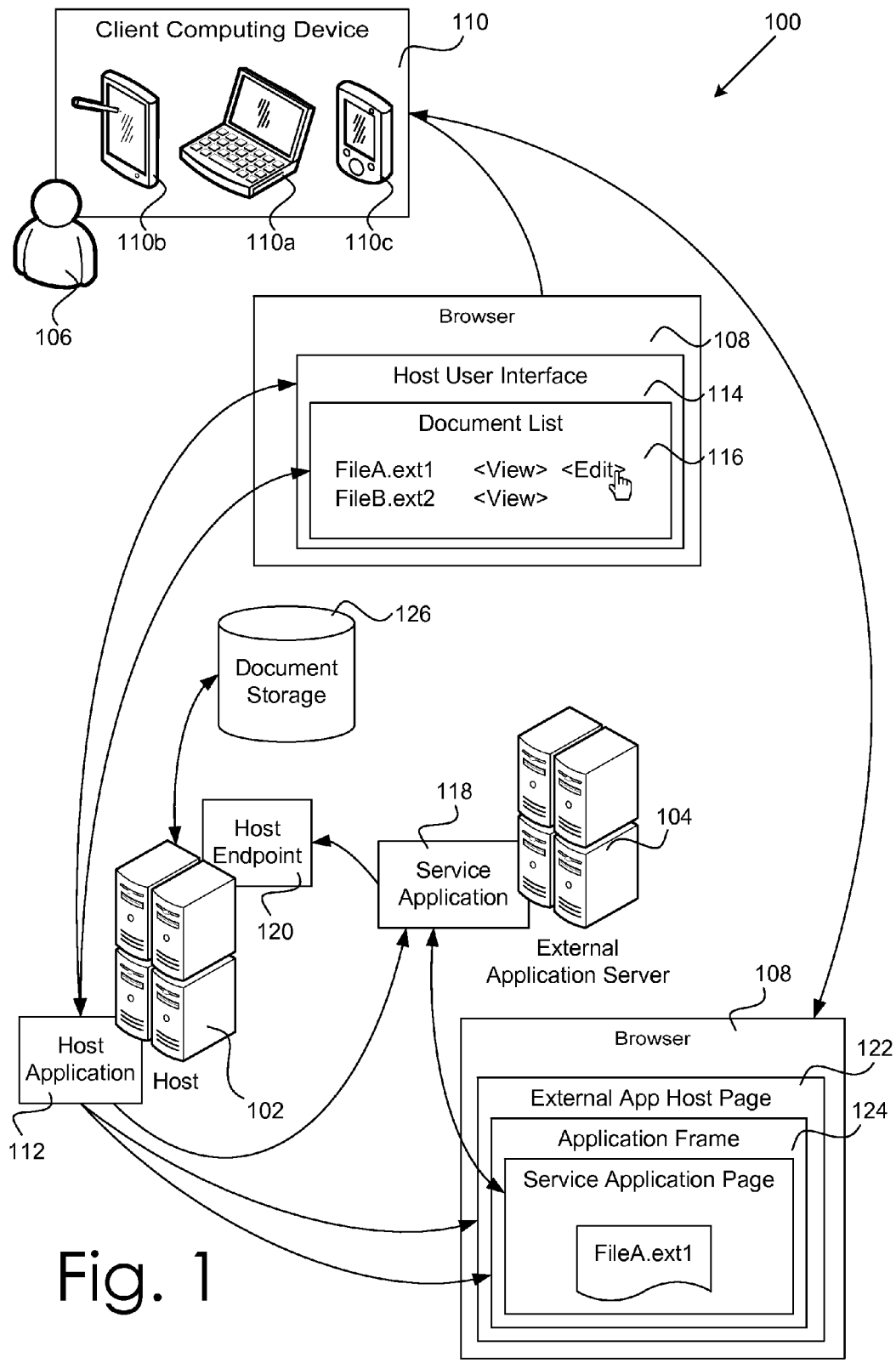
FIG. 1 illustrates a block diagram of an enterprise network including a host and an external application server for practicing one embodiment of the external service application discovery process.

FIG. 1 illustrates one embodiment of an exemplary enterprise network 100 including one or more hosts 102 and one or more external application servers 104. A user 106 accesses the host 102 using a web browser 108 from a client computing device 110. The host 102 is, most generally, a content server that stores documents in a document storage system 126 and manages permissions for the user 106. Generally, the host 102 runs a host application 112 providing a host user interface 114 that handles the normal functions of the host 102. At least some of the normal functions of the host 102 involve providing the user 106 with access to stored documents 116 contained in a content store 126 and intended to be viewed and/or edited using a supporting application. The host 102 also provides a generic platform to make the services of the external application server 104 available to user 106. The external application server 104 provides browser based web applications that allow the user 106 to interact with documents available through the host. The open platform interface defines and directs document operations between the host 102 and the external application server 104. The host 102 also implements an endpoint 120 to receive communications from the external application server. Although the host 102 initiates scenarios involving the services of the external application server 104, the host 102 does not make calls to the external application server 104. Instead, the external application server 104 exposes supported functionality to operate on supported document types using callbacks.

The external application server 104 runs one or more web based service applications 118 enabling the user 106 to access, view, edit, and, optionally, perform other operations on content (i.e., a file or document) and perform folder (i.e., directory) management over the network from the client computing device 110 without requiring a local installation of the appropriate application(s) needed to work with a particular document type. The operation and output of the external application server 104 is not specific to the host 102 that invokes the functionality of the external application server 104. Each service application 118 generally runs as services on the external application server 104. The external application server 104 uses the open platform interface and the set of open platform interface conventions to integrate with the host 102. The external application server 104 provides the necessary operations and functionality to work with a document of a selected file type. The external application server 104 is host agnostic. In other words, the operation and/or output of the external application server 104 are not specific to the host 102 that facilitates access to the services of the external application server 104. Examples of the service applications 118 to handle various document types include the online (i.e., web based) companions to the standard (i.e., locally installed) applications for working with word processing documents, spreadsheets, presentations, and notes.

The operations provided by each service application 118 are typically specific to a selected file type or related to folder management. The core operations provided by the external application server 104 are viewing and editing documents. In various embodiments, the service application 118 provides one or more additional operations including, but not limited to, reformatting a document for viewing on a mobile device, creating a new document, converting a document, embedding a document, and broadcasting a document From the perspective of the external application server 104, broadcasting and embedding are particular interactive user flows. In the case of broadcasting, the external application server 104 displays the document on multiple client computing devices 110 and, in one embodiment, keeps track of the current page being view at each multiple client computing devices 110. The host 102 manages the document upload, broadcast initiation, and the rich client entry points. In another embodiment of the broadcasting operation, page tracking is handled by the host 102.

The supported operations for each service application 118 are accessed through one or more service application entry URLs. Each service application entry URL serves as an entry point to the external application server 104 for a particular operation on a particular document type. Generally, each service application entry URL includes the address of the external application server and specifies the task (e.g., embedded edit using the spreadsheet application), the required data associated with the task, namely the metadata URL for the document and the access token authorizing access, and any optional parameters specific to the task. When the user 106 selects an operation for a document, the host 102 generates a service application entry URL for that operation against the selected document for the user. More specifically, the external application host page 122 generates the URL parameters used with the service application 118. The parameters generated by external application host page 122 include, but are not limited to, the access token and the source URL. The source URL is the URL that the service application 118 uses to access the host endpoint 120 and the document. The access token is a token that is unique to the user/object pair that the host endpoint 120 uses to authenticate the user 106 and authorize access to the document and/or the service application 118. In various embodiments, the access token is calculated based on a hash of one or more of the user identifier, the time stamp, and the document identifier and is encrypted with a secret known to the host 102 (e.g., stored in the host configuration database).

The service application entry points are handled through the wrapper provided by the host 102. The wrapper provided by the host 102 is a framework or environment that displays the output of the external application server 104 and accepts input from the client computing device 110 allowing a user 106 to interact with a document using the functionality provided by the service application 118. In one embodiment, the wrapper includes the external application host page 122 and/or an application frame 124. By way of example, one embodiment of the external application host page 122 generated by the host 102 is a single page that hosts all service application pages in a web page container such as an inline frame (iFrame) with an edge-to-edge layout. The external application host page 122 has no user interface of its own. Alternate implementations of the external application host page may include a user interface or substitute other web page containers and layouts for those described above.

The amount of embedded information potentially results in a long and cumbersome service application entry URL. Further, the inclusion of an expiring access token makes the service application entry URL brittle. The wrapper compensates for the cumbersome and brittle nature of the service application entry URL by providing support for bookmarking and link sharing. In other words, the URL of the external application host page is bookmarkable and shareable. The application frame 124 points at the service application entry URL, and the external application host page 122 optionally presents host chrome and navigation control(s).

The background tasks of the external application server 104 are implemented in a manner similar to that of the user interaction operations, but make use of a hidden frame in the page displayed by the browser displayed by the client computing device 110 to navigate to a service application entry URL and load a script, applet, or other set of instructions (e.g., a JavaScript) that drives the task, provides retry logic, and allows for notification of final state by navigating the parent frame. In one embodiment, background tasks are used for host directed document conversion.

When a service application performs file level operations, it makes requests to the host endpoint 120 using the open platform interface. The host endpoint 120 is a web service that understands requests made using the open platform interface. Various embodiments of the host endpoint 120 are implemented as a REST based web service. In some embodiments, communications with the host endpoint 120 are handled exclusively through a secure transport protocol (e.g., HTTPS) in order to protect the authentication token and the content of the files. In one embodiment, the host endpoint URL is created by appending the location of the host endpoint web service to the host URL.

The external application server 104 provides the necessary functionality to access, edit, view, and otherwise manipulate or work with various document types. In the described embodiment, the external application server 104 does not include the complexity and overhead associated with network access, user authentication, file storage, network and file security, and other administrative tasks normally handled by other servers within a network and often specific to a particular enterprise. Omitting such features and focusing the external application server on handling document operations through the open platform interface allows the external application server 104 to be used in a wide range of enterprise network scenarios. It should be appreciated that an external application server 104 performing as described herein and assuming additional roles and responsibilities normally handled by other servers on the enterprise network falls within the scope and spirit of the present invention.

The host 102 is an online server application capable of being accessed over a network using a general client application, such as a web browser. The services provided by the external application server 104 are consumed by the host 102 and made available to a client computing device 110. When attached to an external application server 104, the host 102 becomes aware of each service application 118 and functionality supported by the external application server 104. Examples of suitable host systems include, but are not limited to, mail systems allowing web based access (e.g., Microsoft Exchange Server®), unified communication systems (e.g., IBM Lotus Sametime®, Microsoft Lync®, and Unison®), and content and/or document management systems (e.g., IBM Lotus Quickr® and Microsoft Share Point®).

The host 102 has a number of responsibilities to facilitate interaction between the client computing device 110 and the external application server 104. The host 102 stores the user's data and initiates scenarios involving the external application server 104. The host 102 implements the wrapper for displaying the user interface pages hosted by each service application 118. Additionally, the host 102 implements and exposes the host endpoint 120 for receiving communications from the external application server 104. The host endpoint 120 is a web service that understands requests made using the open platform interface. The host 102 also provides file operations for the service application 118 via requests made using the open platform interface. Other responsibilities of the host 102 include handling access control to documents at the user level and license enforcement for the external application server 104. In one embodiment, the host 102 handles access control by generating an expiring access token (i.e., the authorization element) that is passed to the external application server 104 to authorize the requested operation.

Integration with the external application server is another responsibility of the host accomplished through a process called discovery during which the host learns about the functionality supported by external application server. Prior to discovery, the host is not required to have any knowledge of the availability or functionality of an external application server. All that is necessary is that the host understands the open platform interface used by the external application server. The behavior of the host changes based on the availability and functionality of the external application server.

The configuration, functionality, level of implementation of the open platform interface and the adherence to the conventions of the open platform interface by the host 102 determines the functionality of external application server available to the end user. If the host does not fully implement the open platform interface or does not meet the requirements for certain functionality of the external application server, that functionality is not available to the user. More specifically, if the host does not advertise support for specific functionality, the service application suppresses any features that require the unsupported functionality. For example, the service application should not allow the user to edit a document when the host is not capable of saving an updated copy of the file. Further, administrative control over access to a connected service application is optionally available through configuration of the host.

The host manages licensing for the service applications provided by the external application server. The host checks licensing at the same time it checks the user's permissions against a file. In order to perform the selected operation on the document, the user must have both appropriate permissions to perform the operation on the file and a valid license to use the associated service application. The host reports the results of the permission and licensing checks to the external application server. Additionally, the host optionally checks to see whether access to a particular document type supported by a service application is blocked via administrative control configured in the host. A blocked document type cannot be saved or retrieved by the host.

In various embodiments, the host checks licensing in response to a clicking a file type associated with a service application before invoking the default action. If the user does not have an appropriate license for the service application associated with the operation for a default click, the host does not attempt to execute the command (i.e., invoke the operation). In other embodiments, the host does not attempt to execute commands for which the user lacks appropriate permissions or against blocked document types.

In various embodiments, the host also checks licensing when generating dynamic user interface controls, such as a context menu, used to access to the functionality provided by the external application server. The dynamic user interface control generally provides the user with a list of operations that are available for that document type. If the user does not have an appropriate license for the service application associated with an operation for the document type, the host does not display the command in the dynamic user interface control. In other embodiments, the dynamic user interface control does not show commands for which the user lacks appropriate permissions or in connection with blocked document types.

In various embodiments, basic functionality, such as a view operation, are available without a license while advanced functionality, such as edit and conversion operations, requires a license. In one embodiment, use of the service application is licensed per user or per machine. In another embodiment, use of the service application is limited by the number of available concurrent licenses. In a further embodiment involving multiple service applications, a single license either applies to use of all service applications provided by a single external application server. In yet another embodiment, a license is required for each service application.

As mentioned previously, the host is a content server in which the host provides document storage. In an alternate embodiment, the host is configured to provide access to documents stored outside of the host (e.g., stored in the network file system or on a network attached storage device). In an alternate embodiment, the external application server is configured to request documents stored in any accessible content server or file storage system that accepts and understands file operation requests made using the open platform interface.

Online access to the host and the service application is provided by a web server. The external application server is most responsive when it has exclusive access to the web server. Communication lags resulting from shared use of the web server are more likely to make the experience less positive for the end user. A shared web server is acceptable in some situations where the other applications sharing the web server have low bandwidth requirements, are infrequently accessed, and/or transfer small amounts of data. In one embodiment, the host and/or the external application server use the services of an independent web server. In another embodiment, the external application server integrates a web server. In a still further embodiment, the host integrates a web server used by the external application server.

The open platform interface used for communication between the host and the external application server allows interaction with documents and uses an access token as an authorization/authentication mechanism.

The open platform interface is both extensible and provides support for cross-version interface communication. The basic data transport mechanism of the open platform interface facilitates cross-platform communication. In various embodiments, the basic data is transferred in a JavaScript Object Notation (JSON) body, although it should be recognized that other human and/or machine readable data interchange formats fall within the scope and spirit of the present invention. The open platform interface also follows the service oriented architecture principles of "ignore what you weren't expecting" and "use default values for data you were expecting but didn't get" used by some application programming interfaces such as the Windows Communication Foundation (WCF). The semantic of "default values must result in acceptable behavior" used by the open platform interface helps maintain functionality in a highly cross-versioned world. This semantic is particularly useful maintaining functionality between SkyDrive, Hotmail, and the production and integration environments of the external application server.

The primary extensibility mechanism of the open platform interface is through the declaration, implementation, and consumption of functional sets (e.g., Cobalt, CoAuth, Locking, Update). The core open platform interface only contains a method for getting the metadata associated with a document and a method for getting the document data. All other methods supported by the host are declared within the document metadata and returned as a list of supported functional sets. Each functional set is declared by string, and promises the implementation a set of methods supported by the open platform interface. The open interface defines the names of the functional sets and the associated methods promised by the functional set. The functional sets available for a host to implement are limited by the conventions of the open platform interface. In other words, the open platform interface does not provide a mechanism to attempt a fully generic method discovery similar to what Simple Object Access Protocol (SOAP) metadata exchange provides. The open platform interface is easily extended by declaring new functional sets.

In order to provide access to a service application, the host 102 must learn of the availability of and the functionality provided by the external application server 104. The external service application discovery process allows the host 102 to learn about an available external application server without requiring an administrator to manually configure the host 102. During the external service application discovery process the host 102 learns the file formats and the open platform interface verbs that are supported by the external application server 104.

Figure 2:
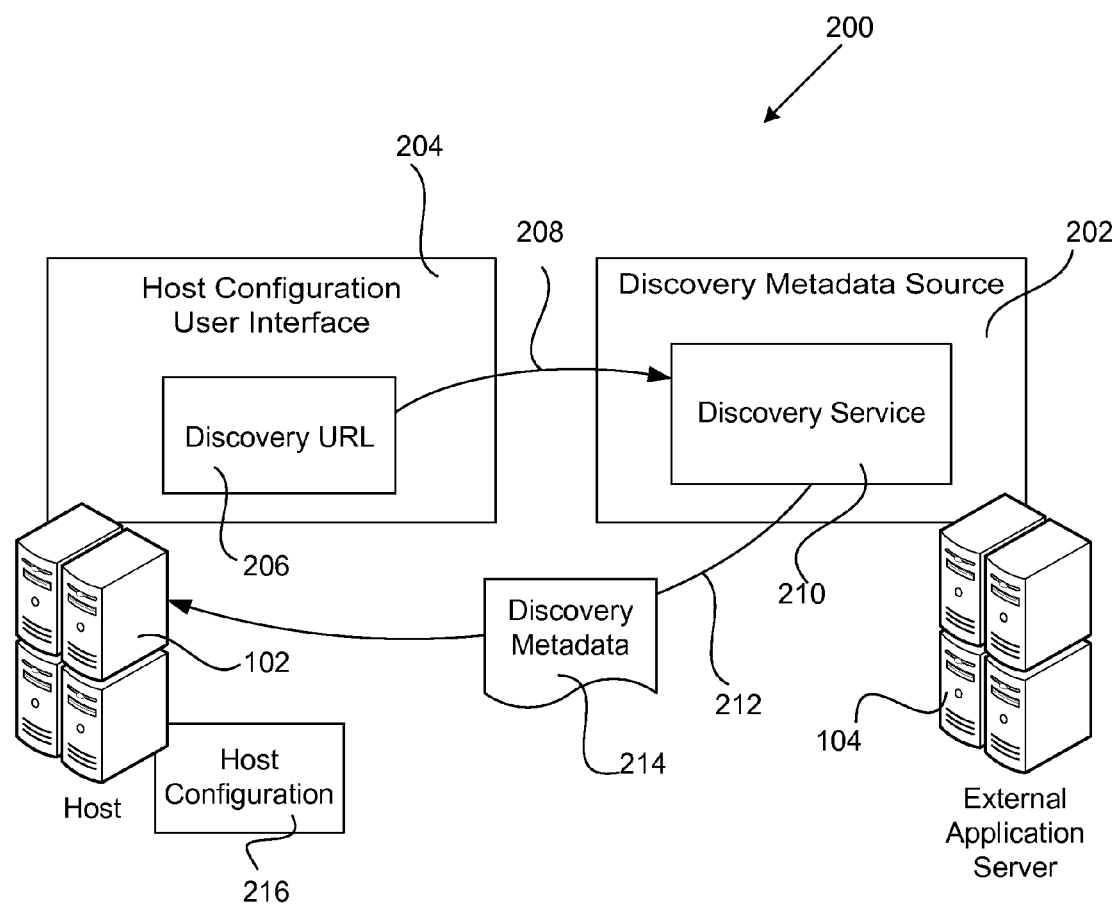
FIG. 2 illustrates a flow diagram of the external application service discovery process between a host and the external application server.

FIG. 2 illustrates a flow diagram of the external service application discovery process 200 connecting the host 102 with the external application server 104. The external service application discovery process 200 is initiated from the host by providing the location of a discovery data source 202 which contains the information describing the functionality of the external application server 104. In the illustrated embodiment, the discovery data is contained in a discovery configuration document maintained by the external application server 104, and the discovery data source 202 is the discovery endpoint of the external application server 104 addressed by a discovery URL (e.g., a domain name). In the illustrated embodiment, the host 102 accepts the external application server location via the host's configuration user interface 204 and produces the discovery URL 206. In one embodiment, the discovery endpoint 202 has a fixed location relative to the location of the external application server 104, and the host 102 generates the discovery URL by appending the location of the discovery endpoint 202 (e.g., a relative path) to the location of the external application server 104. In another embodiment, the administrator must specify the complete discovery URL 206. Alternatively, the discovery data consumed by the host is not provided by the service application server. Instead, the discovery data source 202 is a file (i.e., the discovery configuration document) provided by the administrator and the location of the discovery data source 202 provided to the host 102 is the location of that file.

After obtaining the discovery URL, the host 102 issues a discovery request 208 to the discovery endpoint 202. In one embodiment, the discovery request 208 is an HTTP GET request against the discovery URL. The discovery endpoint 202 provides the host 102 with the ability to connect with the discovery service 210. Upon receipt of the discovery request 208, the discovery service 210 responds with a discovery response message 212 containing the discovery data 214 describing the functionality provided by the service application running on the external application server. The discovery data 214 is formatted according to and contains information specified by the conventions of the open platform interface. In one embodiment, the discovery response message 212 does not contain any HTML in the message body. Instead, the body contains the discovery data described in an XML format understood by the host. In various embodiments, the discovery data contains information such as an identifier for the service application, a description of the service application, a file extension, an operation (i.e., action) associated with the file extension, any open platform interface implementation requirements for the host (e.g., functional sets), the location of the service application responsible for handling the operations, and/or a mime type for the documents associated with the file extension.

The host 102 consumes the discovery data 214 returned by the discovery service 210. After consuming the discovery data 214, the host 102 stores the information about the actions supported by the service application for the associated file type in the host configuration store 216 (i.e., registers the service application). After completing the external service application discovery process 200, the behavior of the host changes to integrate the supported functionality of the service application.

The discovery data content and structure is specified by the open platform interface. The core data for discovery includes the action identifier, the file type associated with the action, and source URL for invoking the action. Optional discovery data includes the service application identifier, the requirements for the host to support the action, the folder/directory identifier, the network zone identifier, the default click behavior, the target extension identifier, and the proof identifier. The action identifiers are defined by the conventions of the open platform interface and define the operations allowed against a particular file type. Examples of action identifiers include view, edit, editnew, mobileview, mobilehandler, embedview, present (present a broadcast), attend (attend a broadcast), convert. The file type describes the type of file to which the action applies. In one embodiment, the file type is specified by a file extension. The source URL specifies the input data for determining the absolute URL of the external application server that performs the action for the matching file type. The service application identifier is a human and machine readable identifier (e.g., a string value) for the supporting application (e.g., "Microsoft Excel Web App") identifies the service application. The network zone identifier describes the specific parameters (e.g., the source URL) used for the action when invoked from a particular network zone. The service application identifier and the network zone identifier are used to group the file type/operation pairs and offer a meaningful way of presenting the available service applications in the host configuration user interface. The folder/directory identifier is used with or instead of the file type for certain actions to identify the object of the action. The default click behavior specifies the action invoked by host when the user selects a file types supported by the service application without selecting a specific action through the user interface. The target extension identifier specifies the file type of the target file for the convert action. In one embodiment, the target extension identifier is specified by a file extension.

Registration associates the file types supported by each service application 118, the operations supported by the external application server 104 for each supported file type, and the URLs of a computing device in the external application server used to invoke the operations for each supported file type. In other words, when the host 102 connects to the external application server 104, the external application server 104 returns a list of paired file types and operations together with the URL used to invoke that operation for that file type. The parameters needed in the URL are defined by the open platform interface.

During discovery, the host chooses to make use of or ignore individual actions based on the conventions understood by the host at the time. In one embodiment, the host 102 verifies that it supports the requirements for the operation before registering the paired file type and operation. If the host 102 does not support the operation and/or meet the hosting requirements, the paired file type and operation is not registered. More specifically, in some embodiments, the host uses the "requires" attribute, which specifies the open platform interface implementation requirements, to filter out actions the host cannot support. In other words, if the host does not recognize or understand all the fields listed in the "requires" attribute value or chooses not to support that convention of the open platform interface, the host does not register (i.e., implement) the paired file type and operation and does not offer that functionality to the user.

The source URL uses parameters to produce the valid service application entry URL associated with each action. As with the actions, the service application entry URL parameters are specified by convention in the open platform interface. Some parameters are required and others are optional. In one exemplary embodiment, the required parameters are delimited by square brackets ("[" and "]") and the optional parameters are delimited by angled brackets ("<" and ">"). If the host does not understand a required parameter, the host does not register the action. Conversely, when an optional parameter is not understood, the host may choose to register the action. In such case, the functionality associated with the optional parameter is simply lost, but the host is still able to provide the action with as much functionality as the host understands. This behavior provides the basis for cross-version compatibility between different versions of the open platform interface. Even if an upgrade of the service application server provides new functionality, the host continues to work with the upgraded service application server. The host simply continues to provide support for the functionality it understands and ignores any functionality it does not understand. Examples of optional parameters include the language of the user interface, the language of the object's user interface, whether or not to embed the presentation frame, whether or not to allow a presentation attendee to independently switch slides, and whether or not to show thumbnails for slides.

The host is often accessible from various network zones. A network zone is often described by whether it is internal or external to the network and by the whether transport layer security is used. In order to fully describe the functionality of the external application server to the host, one embodiment of the discovery data describes the file type/operation pairs for one or more possible zone configurations through the network zone identifier. For example, to work with a host that is accessible from via both an extranet (e.g., the internet) and an intranet (e.g., the enterprise local area network), one embodiment of the discovery data describes each file type/operation pair with an service application URL for internal use and an service application URL for external use. Similarly, one embodiment of the discovery data describes the file type/operation pairs with an service application URL for use with open network protocols (e.g., HTTP) and secure network protocols (e.g., HTTPS) to accommodate hosts that allow access using both secure and unsecure network protocols. Another embodiment of the discovery data describes each file type/operation pair with a service application URL for each combination of internal/external and secure/insecure use (e.g., internal-http, external-http, internal-https, external-https). In some embodiments, the discovery conventions provide a fallback position to a lower security zone when the host is not configured for a secure network. In other words, if the host is not configured to a secure network protocol, service application URL specified to use a secure network protocol is altered and registered using a corresponding open network protocol. As a result, the functionality of the service application server is made available to the user, but without the benefit the secure network protocol.

For simplicity, one embodiment of the external service application discovery process defaults to associating the service applications with all zones configured in the host and sets the host endpoint allow list to allow all zones. Administrative control over the integration between the service applications and the various zones is available through some hosts. In various embodiments, integration is disabled at the service application server level (i.e., all service applications provided by the service application server are enabled or disabled) or at the service application level (i.e., service applications are selectively enabled or disabled). Where integration with the service application server/service application is disabled, the host does not list the operations in dynamic user interface controls or attempt to execute the commands.

Optionally, the discovery data provided to the host includes cryptographic key information specific to the service application server. The cryptographic key information provides the host with a mechanism by which to verify that a request was in fact made by the service application server. When a request arrives at the host endpoint, the host optionally uses the cryptographic key information to validate the cryptographic signatures of the request. If the cryptographic signature cannot be validated, the host ignores the request.

In the various embodiments, the host implements error checking during the external service application discovery process. In one embodiment, the host generates a notification if the discovery URL is malformed. In another embodiment, the host generates a notification if the external application server is unresponsive or cannot be located. In a further embodiment, the host generates a notification if the discovery response is malformed. In yet another embodiment, the host generates a notification in the event of a conflict (i.e., if the external application server attempts to register a file type that is already registered) and does not register the service application.

In one embodiment, discovery occurs only when initiated by an administrator so the host and service application server do not automatically become aware of any changes in supported functionality of the other. In alternate embodiments, once the host and the service application server are connected, the discovery process provides an automated mechanism for updating the supported functionality. In the various embodiments of the automated discovery update process, updates are provided on a periodic basis (e.g., scheduled polling) or in real time (e.g., push notifications). Further, the various embodiments of the automated discovery update process are implemented on the host side (e.g., periodically repeating the discovery process) or the service application server side (e.g., the discovery service notifies the host of changes).

The inclusion of the external application server provides document handling services that are independent from the host. This eliminates the need to add new components or substantially modify the configuration of a working host that supports the external application server. By not modifying the operation or adding new components to a working host, the potential for breaking the working configuration or requiring substantial downtime of the host is minimized. This also allows the external application server services to upgraded, modified, added, or removed without requiring reconfiguration of the host. This is particularly beneficial because new versions and upgrades to document handling applications tend to occur much more frequently than upgrades to core services like the host. In other words, the enterprise is relieved from the downtown, risk, and burden of modifying the host just to take advantage of improvements to existing document handling applications, to add newly developed or newly required document handling applications, or to remove obsolete or deprecated document handling applications.

Figure 3:
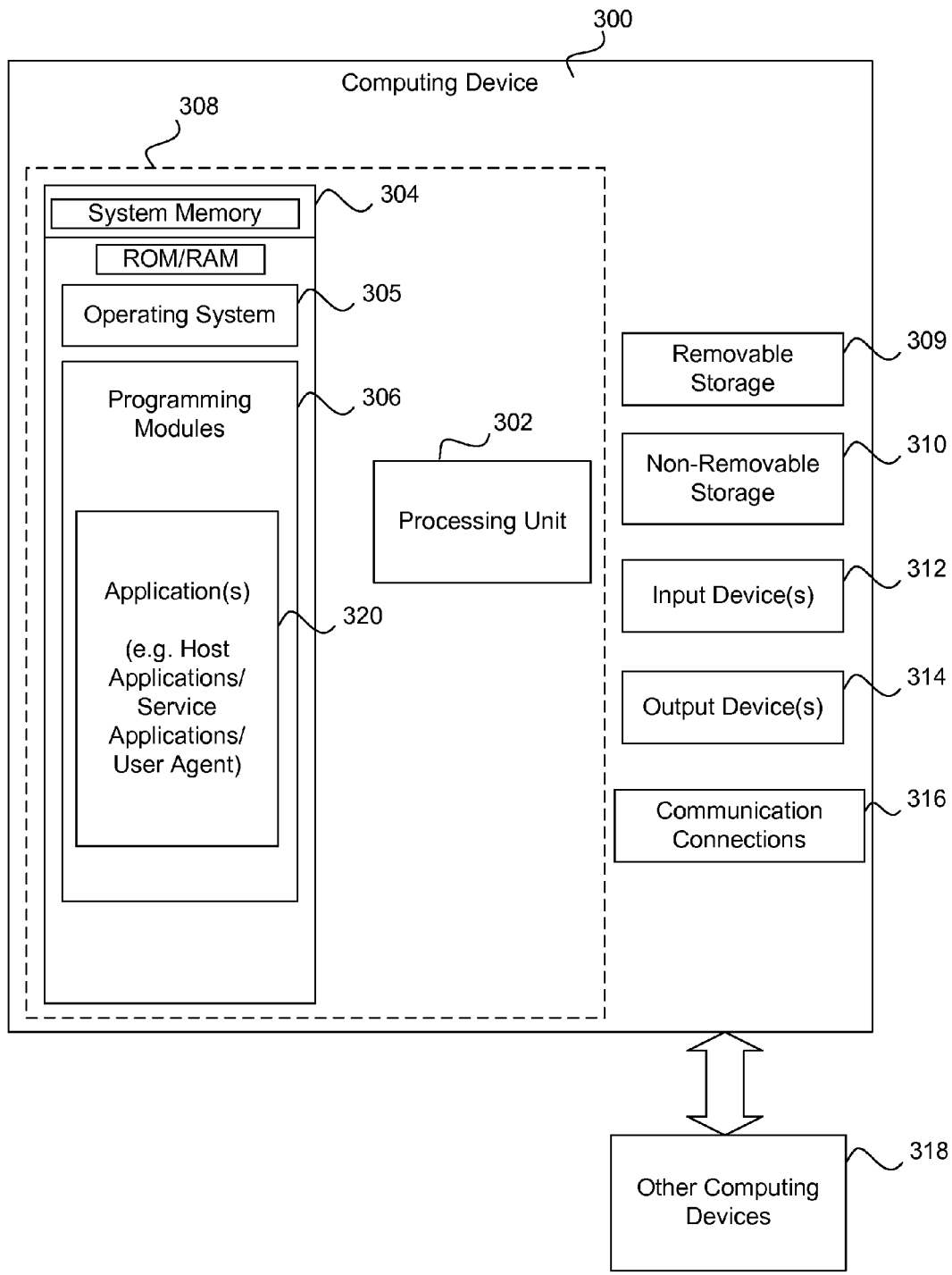
FIG. 3 is a simplified block diagram of a computing device with which embodiments of the present invention may be practiced.

The embodiments and functionalities described herein may operate via a multitude of computing systems such as the host 102, and the external application server 104, and the client device 110 described above with reference to FIG. 1, including wired and wireless computing systems, mobile computing systems (e.g., mobile telephones, tablet or slate type computers, laptop computers, etc.). In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 3 through 5 and the associated descriptions provide a discussion of a variety of operating environments in which embodiments of the invention may be practiced. However, the devices and systems illustrated and discussed with respect to FIGS. 3 through 5 are for purposes of example and illustration and are not limiting of a vast number of computing device configurations that may be utilized for practicing embodiments of the invention, described herein.

FIG. 3 is a block diagram illustrating example physical components of a computing device 300 with which embodiments of the invention may be practiced. The computing device components described below may be suitable for the computing devices described above, for example, the host 102, the external application server 104, and the client computing device 110. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305 and one or more programming modules 306, which are suitable for running applications 320 such as client application (e.g., the user agent/web browser 108) or server applications (e.g., the host application 112 or the service applications 118). Operating system 305, for example, may be suitable for controlling the operation of computing device 300. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310.

As stated above, a number of program modules and data files may be stored in system memory 304, including operating system 305. While executing on processing unit 302, programming modules 306 may perform processes including, for example, one or more of the stages of the external service application discovery process 200. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality of server applications 320 or client applications 322 may be implemented via application-specific logic integrated with other components of the computing device 300 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. Computing device 300 may include communication connections 316 allowing communications with other computing devices 318. Examples of suitable communication connections 316 include, but are not limited to, RF transmitter, receiver, and/or transceiver circuitry; universal serial bus (USB), parallel, or serial ports, and other connections appropriate for use with the applicable computer readable media.

Figure 4A:
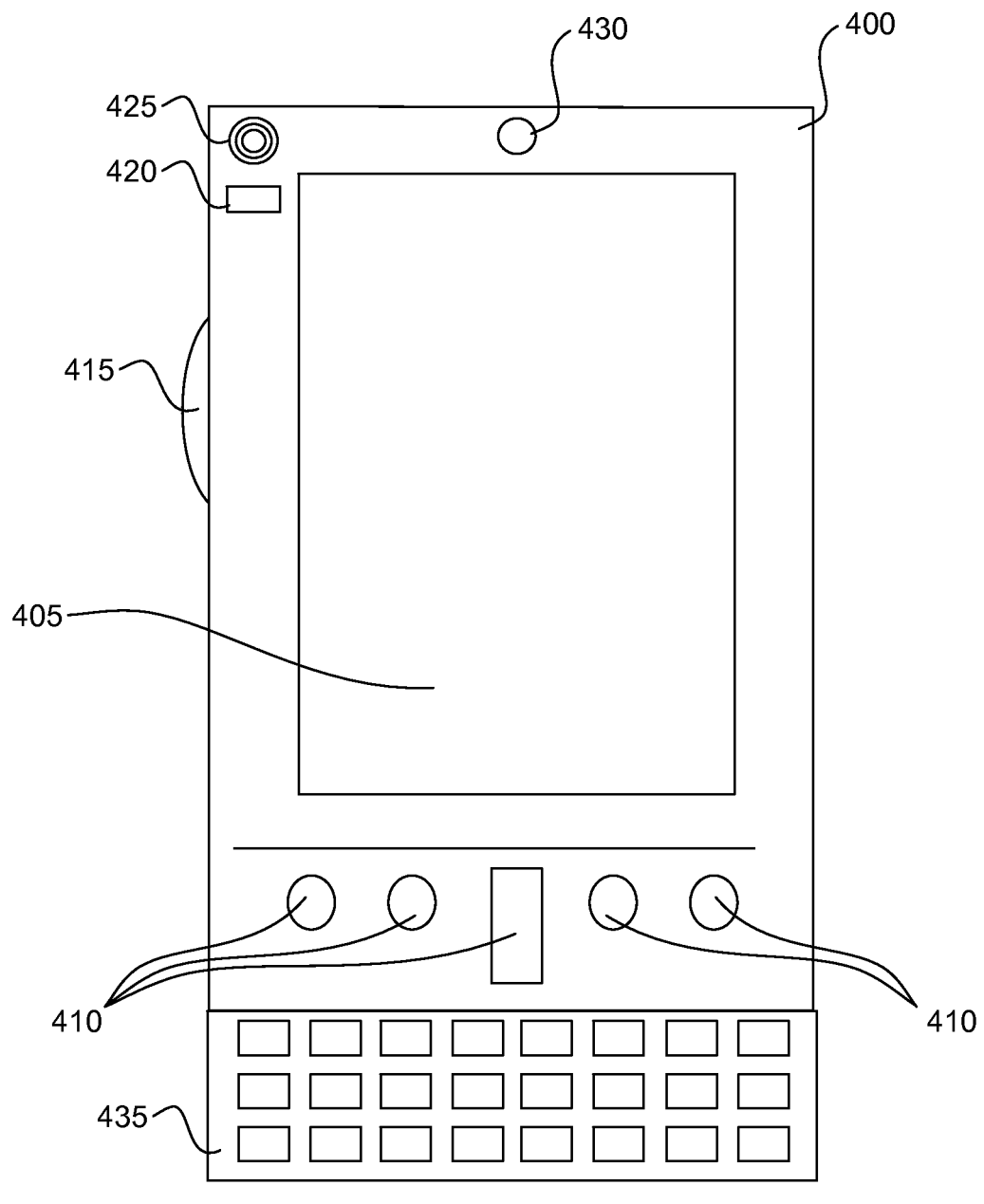
FIGS. 4A and 4B are simplified block diagrams of a mobile computing device with which embodiments of the present invention may be practiced.
Figure 4B:
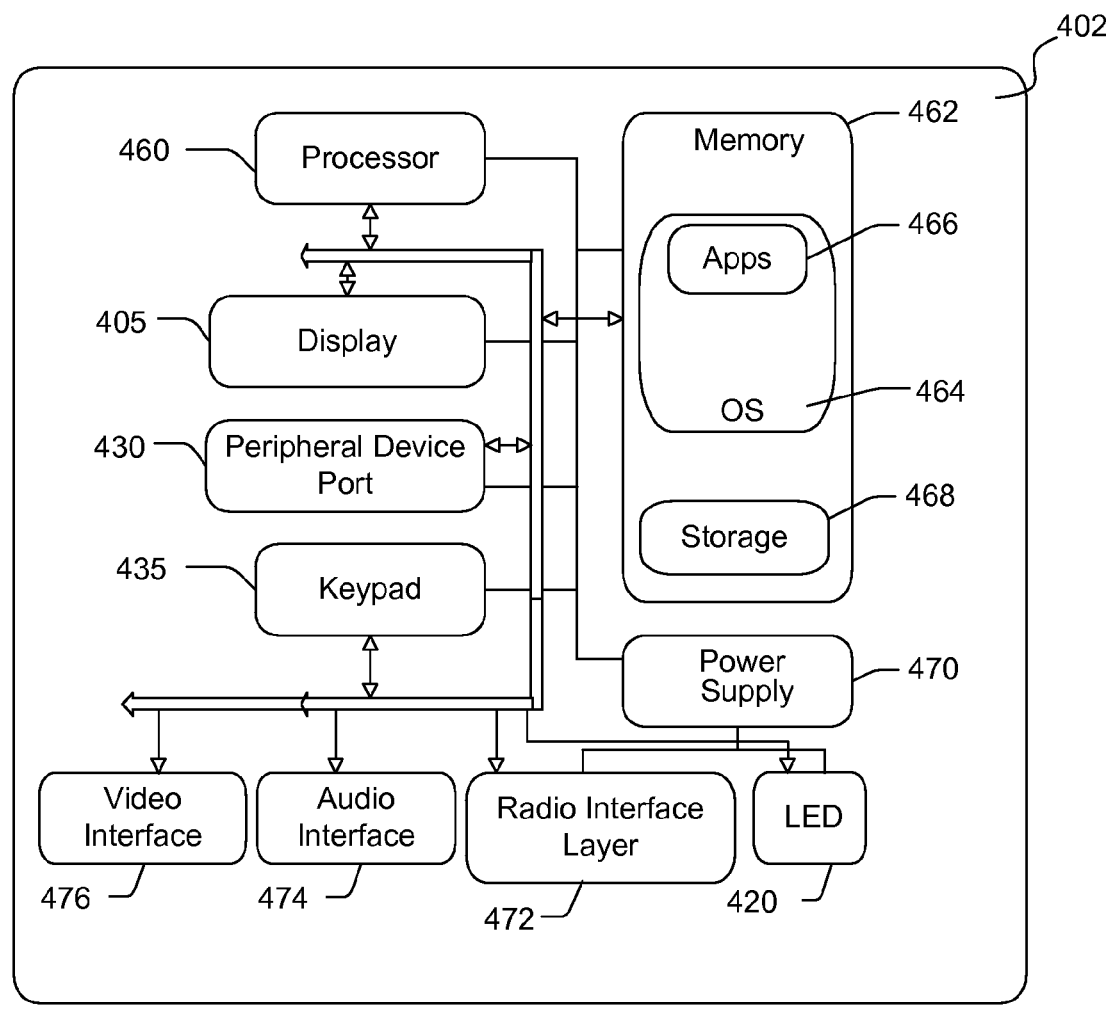
Figure 5:
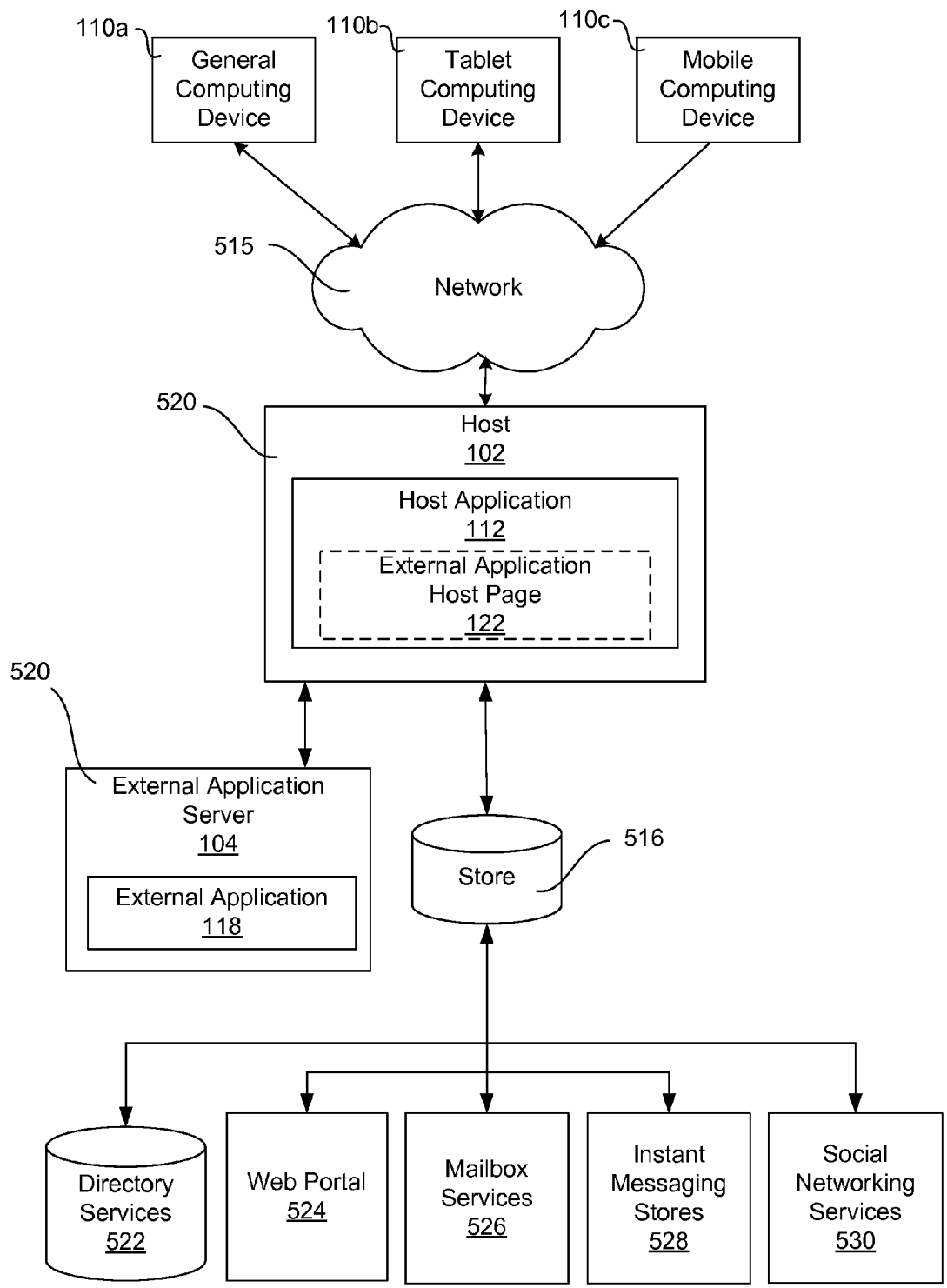
FIG. 5 is a simplified block diagram of a distributed computing system in which embodiments of the present invention may be practiced.

FIGS. 4A and 4B illustrate a suitable mobile computing environment, for example, a mobile telephone 400, a smart phone, a tablet personal computer, a laptop computer, and the like, with which embodiments of the invention may be practiced. With reference to FIG. 4A, an example mobile computing device 400 for implementing the embodiments is illustrated. In a basic configuration, mobile computing device 400 is a handheld computer having both input elements and output elements. Input elements may include touch screen display 405 and input buttons 410 that allow the user to enter information into mobile computing device 400. Mobile computing device 400 may also incorporate an optional side input element 415 allowing further user input. Optional side input element 415 may be a rotary switch, a button, or any other type of manual input element. In alternative embodiments, mobile computing device 400 may incorporate more or less input elements. For example, display 405 may not be a touch screen in some embodiments. In yet another alternative embodiment, the mobile computing device is a portable phone system, such as a cellular phone having display 405 and input buttons 410. Mobile computing device 400 may also include an optional keypad 435. Optional keypad 435 may be a physical keypad or a "soft" keypad generated on the touch screen display.

Mobile computing device 400 incorporates output elements, such as display 405, which can display a graphical user interface (GUI). Other output elements include LED light 420 and speaker 425. Additionally, mobile computing device 400 may incorporate a vibration module (not shown), which causes mobile computing device 400 to vibrate to notify the user of an event. In yet another embodiment, mobile computing device 400 may incorporate a headphone jack (not shown) for providing another means of providing output signals.

Although described herein in combination with mobile computing device 400, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 4B is a block diagram illustrating components of a mobile computing device used in one embodiment, such as the computing device shown in FIG. 4A. That is, mobile computing device 400 can incorporate system 402 to implement some embodiments. For example, system 402 can be used in implementing a "smart phone" that can run one or more applications similar to those of a desktop or notebook computer such as, for example, browser, e-mail, scheduling, instant messaging, and media player applications. In some embodiments, system 402 is integrated as a computing device, such as an integrated personal digital assistant (PDA) and wireless phone.

One or more application programs 466 may be loaded into memory 462 and run on or in association with operating system 464. Examples of application programs include phone dialer programs, e-mail programs, personal information management (PIM) programs, word processing programs, spreadsheet programs, Internet browser programs, messaging programs, and so forth. System 402 also includes non-volatile storage 468 within memory 462. Non-volatile storage 468 may be used to store persistent information that should not be lost if system 402 is powered down. Applications 466 may use and store information in non-volatile storage 468, such as e-mail or other messages used by an e-mail application, and the like. A synchronization application (not shown) also resides on system 402 and is programmed to interact with a corresponding synchronization application resident on a host computer to keep the information stored in non-volatile storage 468 synchronized with corresponding information stored at the host computer. As should be appreciated, other applications may be loaded into memory 462 and run on the device 400, including the various client and server applications described herein.

System 402 has a power supply 470, which may be implemented as one or more batteries. Power supply 470 might further include an external power source, such as an AC adapter or a powered docking cradle that supplements or recharges the batteries.

System 402 may also include a radio 472 that performs the function of transmitting and receiving radio frequency communications. Radio 472 facilitates wireless connectivity between system 402 and the "outside world", via a communications carrier or service provider. Transmissions to and from radio 472 are conducted under control of the operating system 464. In other words, communications received by radio 472 may be disseminated to application programs 466 via operating system 464, and vice versa.

Radio 472 allows system 402 to communicate with other computing devices, such as over a network. Radio 472 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 402 is shown with two types of notification output devices: light emitting diode (LED)

420 that can be used to provide visual notifications and an audio interface 474 that can be used with speaker 425 to provide audio notifications. These devices may be directly coupled to power supply 470 so that when activated, they remain on for a duration dictated by the notification mechanism even though processor 460 and other components might shut down for conserving battery power. LED 420 may be programmed to remain on indefinitely until the user takes action to indicate the powered-on status of the device. Audio interface 474 is used to provide audible signals to and receive audible signals from the user. For example, in addition to being coupled to speaker 425, audio interface 474 may also be coupled to a microphone to receive audible input, such as to facilitate a telephone conversation. In accordance with embodiments of the present invention, the microphone may also serve as an audio sensor to facilitate control of notifications, as will be described below. System 402 may further include video interface 476 that enables an operation of on-board camera 430 to record still images, video stream, and the like.

A mobile computing device implementing system 402 may have additional features or functionality. For example, the device may also include additional data storage devices (removable and/or non-removable) such as, magnetic disks, optical disks, or tape. Such additional storage is illustrated in FIG. 4B by storage 468. Computer storage media may include volatile and nonvolatile, removable and non-removable media implemented in any method or technology for storage of information, such as computer readable instructions, data structures, program modules, or other data.

Data/information generated or captured by the device 400 and stored via the system 402 may be stored locally on the device 400, as described above, or the data may be stored on any number of storage media that may be accessed by the device via the radio 472 or via a wired connection between the device 400 and a separate computing device associated with the device 400, for example, a server computer in a distributed computing network, such as the Internet. As should be appreciated such data/information may be accessed via the device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates a system architecture for providing the browser application 108, the host application 112, and/or the service applications 118 to one or more client devices, as described above. Content developed, interacted with or edited in association with the host application 112, and/or the service applications 118 may be stored in different communication channels or other storage types. For example, various documents may be stored using directory services 522, web portals 524, mailbox services 526, instant messaging stores 528 and social networking sites 530. The host application 112 and/or the service applications 118 may use any of these types of systems or the like for enabling data utilization, as described herein. A server 520 may provide the host application 112 and/or the service applications 118 to clients. As one example, server 520 may be a web server providing the host application 112, and/or the service applications 118 over the web. Server 520 may provide the host application 112 and/or the service applications 118 over the web to clients through a network 515. Examples of clients that may access the host 102 include computing device 300, which may include any general purpose personal computer 110a, a tablet computing device 110b and/or mobile computing device 110c such as smart phones. Any of these devices may obtain content from the store 516.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

What is claimed is:

1. A method for a host to discover an external application server running a service application allowing users to interact with a document of a selected file type, said method comprising the steps of:
 initiating a discovery request for information about a service application server from said host;
 receiving a discovery response at said host, said discovery response including:

information identifying a name of the service application hosted by the service application server;

information describing an action available to be performed by the service application on the selected file type; and information describing requirements of the host to support the action available to be performed by the service application on the selected file type;

parsing said discovery response at said host to learn about said action provided by the service application of the external application server; and based on a determination that the host supports the action, registering an association between said action and the selected file type to integrate the action associated with the selected file type into a plurality of actions associated with the service application and made available by the host.

2. The method of claim 1 characterized in that said action comprises at least an action identifier associated with said action, a file type identifier associated with said action, and an address of the service application server running the service application.

3. The method of claim 2 characterized in that said action further comprises a requirement parameter associated with said action, said requirement parameter specifying a set of capabilities required of said host in order to support said action.

4. The method of claim 3 characterized in that said step of parsing said discovery response further comprises the step of determining that said host does not support said action when said host lacks at least one capability specified in said set of capabilities.

5. The method of claim 2 characterized in that said step of parsing said discovery response further comprises the step of determining that said host does not support said action when said host does not understand said action identifier.

6. The method of claim 2 characterized in that said entry point comprises a uniform resource locator for said service application server.

7. The method of claim 2 characterized in that said information further comprises a service application identifier associated with said action.

8. The method of claim 2 characterized in that said information further comprises a network zone identifier associated with said action.

9. The method of claim 2 characterized in that said information further comprises a folder/directory identifier associated with said action.

10. The method of claim 2 characterized in that said information further comprises a target file type identifier associated with said action.

11. The method of claim 1 characterized in that said discovery response further comprises a proof identifier associated with said service application server.

12. The method of claim 1 characterized in that said proof identifier is a public key known to said service application server and associated with a private key known to said service application server.

13. The method of claim 1 characterized in that said step of initiating a discovery request further comprises the step of specifying a discovery source for said discovery request, said discovery source being selected from the group consisting of a discovery service having an endpoint specified by a uniform resource locator and a file identified by a file location.

14. A method allowing a host computer to learn about a server running a software program allowing a user to work with a document through a web browser, said method comprising the steps of:

at a host computer, asking for information about a server running a software program that allows a user to work with a document, at a host computer, receiving information including:
information identifying a name of the software program hosted by the server;
information describing a plurality of actions associated with the software program, the actions defining the ways that the software program allows the user to work with the document;
information specifying a name for a way of working with the document, a file type supported by the way of working with the document, and an address to let the software program know to use the way of working with the document when selected by a user; and
information describing requirements of the host computer to support the way of working with the document;

at the host computer, reading through the information to learn about ways that the software program allows the user to work with the document;

at the host computer, determining if the host computer recognizes the name for the way of working with the document and satisfies the requirements to support the way of working with the document; and at the host computer, configuring the host computer to associate the file type and the address with the way of working with the document when the host computer recognizes the name to integrate the way of working with the document of the file type into a plurality of ways of working with the document allowed by the software program and made available by the host.

15. The method of claim 14 further comprising the step of, at the host computer, receiving a proof identifier from the server that allows the host computer to verify that the host computer is talking to the server.

16. A method for a host to discover an external application server running a service application allowing users to interact with a document of a selected file type, said method comprising the steps of:

defining a set of known action identifiers understood and supported by an open platform interface implemented by said host;

initiating a discovery request for information about an service application server from said host;

receiving a discovery response at said host, said discovery response including:
information identifying a name of the service application hosted by the service application server;
information describing an action available to be performed by the service application on the selected file type and a proof identifier associated with said service application server, said action comprising an action identifier associated with said action, a file type identifier associated with said action, and an address of the service application server running the service application; and
a requirements parameter associated with said action, said requirements parameter specifying a set of capabilities required of said host to support the action available to be performed by the service application on the selected file type;

parsing said response at said host to learn about said action provided by the service application of the external application server;

ignoring said action when said host does not support said action because said host lacks at least one capability specified in said set of capabilities or said action identifier does not match any known action identifier from said set of known action identifiers; and registering an association between said action and said file type when said host supports said action to integrate the action associated with the selected file type into a plurality of actions associated with the service application and made available by the host.

17. The method of claim 16 characterized in that said information further comprises a service application identifier associated with said action.

18. The method of claim 16 characterized in that said information further comprises a network zone identifier associated with said action.

19. The method of claim 16 characterized in that said information further comprises a target file type identifier associated with said action.

20. The method of claim 16 characterized in that said proof identifier is a public key known to said service application server and associated with a private key known to said service application server.

* * * * *